United States Patent
Sichart et al.

(10) Patent No.: US 9,776,484 B2
(45) Date of Patent: Oct. 3, 2017

(54) WINDING DEVICE FOR A ROLLER BLIND ARRANGEMENT, ROLLER BLIND ARRANGEMENT AND ROOF ARRANGEMENT

(71) Applicant: Webasto SE, Stockdorf (DE)

(72) Inventors: Thomas Sichart, Jesenwang (DE); Johann Hertel, Landsberg (DE); Manfred Nowak, Igling (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/915,793

(22) PCT Filed: Aug. 26, 2014

(86) PCT No.: PCT/EP2014/068091
§ 371 (c)(1),
(2) Date: Mar. 1, 2016

(87) PCT Pub. No.: WO2015/032655
PCT Pub. Date: Mar. 12, 2015

(65) Prior Publication Data
US 2016/0193904 A1      Jul. 7, 2016

(30) Foreign Application Priority Data
Sep. 5, 2013  (DE) .......... 10 2013 109 708

(51) Int. Cl.
*B60J 3/02* (2006.01)
*B60J 7/00* (2006.01)
*B60J 1/20* (2006.01)

(52) U.S. Cl.
CPC .......... *B60J 7/0015* (2013.01); *B60J 1/2033* (2013.01)

(58) Field of Classification Search
CPC .............................. B60J 7/0015; B60J 1/2033
(Continued)

(56) References Cited

U.S. PATENT DOCUMENTS

2006/0054288 A1* 3/2006 Bibby ................. E06B 9/44
160/313
2008/0073039 A1   3/2008 Gyngell et al.
(Continued)

FOREIGN PATENT DOCUMENTS

CN          2745772 Y    12/2005
CN        201671522 U    12/2010
(Continued)

OTHER PUBLICATIONS

International Search Report for PCT/EP2014/068091 dated Oct. 31, 2014; English translation submitted herewith (7 Pages).

*Primary Examiner* — Dennis H Pedder
(74) *Attorney, Agent, or Firm* — Fitch, Even, Tabin & Flannery, LLP

(57) ABSTRACT

A winding device for a roller blind arrangement, in particular for a vehicle, which has a winding element having a longitudinal axis. The winding element is constructed to be rotatably supported about the longitudinal axis on a vehicle and to wind and unwind a roller blind web. The winding device further has a coil spring having an axially extending hollow space, wherein the winding element is connected to the vehicle by means of the coil spring and the coil spring enables a rotational movement of the winding element relative to the vehicle. In addition, the winding device has a rod element which is arranged in the hollow space of the coil spring for guiding the coil spring, wherein the rod element is constructed in such a manner that the rod element radially tensions the coil spring.

9 Claims, 3 Drawing Sheets

(58) Field of Classification Search
USPC .................. 296/214, 37.16; 160/313, 315
See application file for complete search history.

(56) References Cited

U.S. PATENT DOCUMENTS

| | | |
|---|---|---|
| 2014/0284414 A1 | 9/2014 | Nakatsuka et al. |
| 2015/0275575 A1* | 10/2015 | Haarer .................. E06B 9/42 160/315 |

FOREIGN PATENT DOCUMENTS

| | | |
|---|---|---|
| DE | 3725378 A1 | 2/1989 |
| DE | 19903811 C1 | 5/2000 |
| DE | 102005034620 A1 | 1/2007 |
| DE | 102006046440 B3 | 4/2008 |
| DE | 102007012280 A1 | 9/2008 |
| DE | 102010018437 A1 | 7/2011 |
| EP | 1902879 A2 | 3/2008 |
| JP | 2004250225 A | 9/2004 |
| WO | 2013/084803 A1 | 6/2013 |

\* cited by examiner

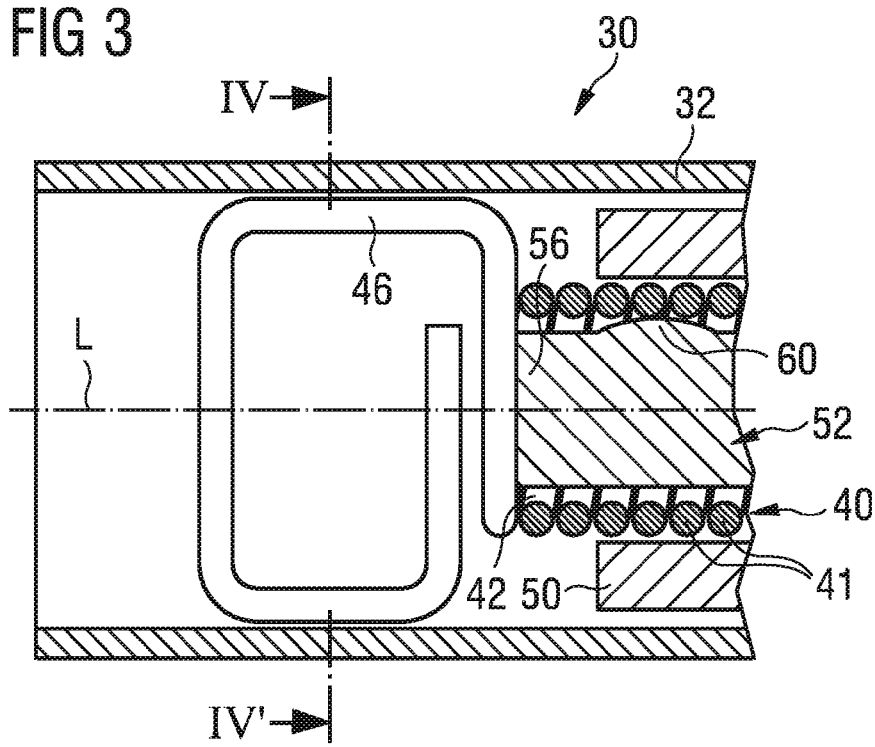
FIG 3
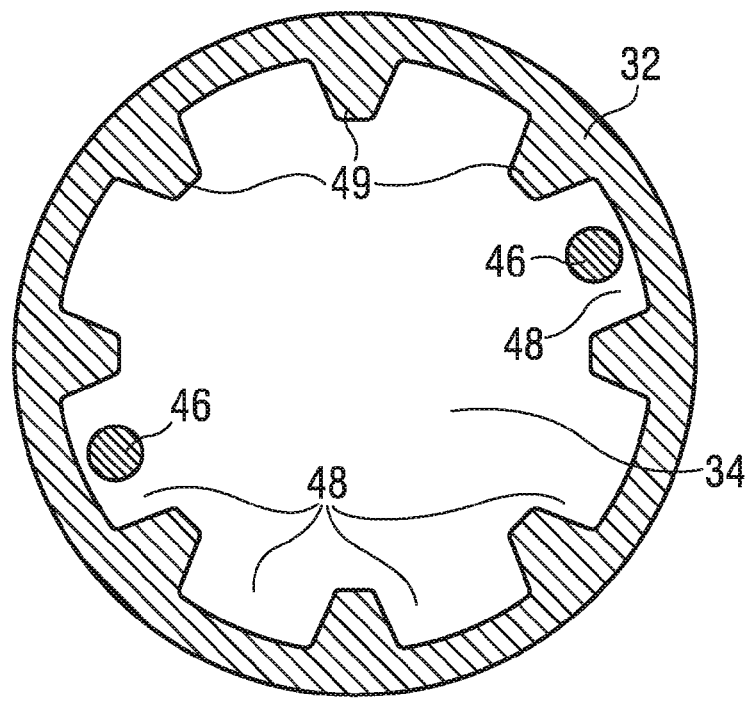
FIG 4  IV-IV'

WINDING DEVICE FOR A ROLLER BLIND ARRANGEMENT, ROLLER BLIND ARRANGEMENT AND ROOF ARRANGEMENT

CROSS-REFERENCE TO RELATED APPLICATIONS

This application is a U.S. national phase application filed under 35 U.S.C. §371 of International Application No. PCT/EP2014/068091, filed Aug. 26, 2014, designating the United States, which claims priority from German Patent Application No. 10 2013 109 708.1, filed Sep. 5, 2013, which are hereby incorporated herein by reference in their entirety for all purposes.

FIELD

The invention relates to a winding device for a roller blind arrangement, in particular for a vehicle, which has a winding element. Furthermore, the invention relates to a roller blind arrangement having such a winding device and a roof arrangement having such a roller blind arrangement.

BACKGROUND

There are known from the prior art roller blind arrangements which are arranged in a vehicle and in which a roller blind web is wound up to form a roller blind winding. To this end, the roller blind arrangements generally have a winding device which is constructed to wind up and unwind the roller blind web.

An object of the invention is to provide a winding device for a roller blind arrangement, a roller blind arrangement and a roof arrangement which enable a simple construction together with low costs and which are distinguished by a high level of mechanical stability.

SUMMARY

According to a first aspect of the invention, there is described a winding device for a roller blind arrangement, in particular for a vehicle, which has a winding element having a longitudinal axis. The winding element is designed to be rotatably supported about the longitudinal axis on a vehicle and to wind and unwind a roller blind web. The winding device further has a coil spring having an axially extending hollow space, wherein the winding element is connected to the vehicle by means of the coil spring and the coil spring enables a rotational movement of the winding element relative to the vehicle. In addition, the winding device has a rod element which is arranged in the hollow space of the coil spring for guiding the coil spring, wherein the rod element is constructed in such a manner that the rod element radially tensions the coil spring.

The winding device according to the first aspect makes provision for a rod element to be arranged in the hollow space of the coil spring. The rod element has, on the one hand, the function of guiding the coil spring so that the coil spring is mechanically stabilized by the internal rod element in all operating states of the winding device. On the other hand, the rod element has the function of radially tensioning the coil spring.

With respect to a rod element which is arranged in a loose or relaxed manner in the coil spring, for example, a rod element which is displaceably and/or rotatably arranged inside the hollow space of the coil spring, the rod element according to the first aspect affords the advantage that, substantially in all operating states of the winding device, a negative noise development, for example, a rattling of the winding device, is reduced. This is a result of the fact that the rod element in the coil spring is arranged in a substantially secure and non-positive-locking manner. That is to say, the rod element expands against it in the hollow space of the coil spring. In particular at very high speeds of the vehicle, for example, up to 250 km/h, but also with powerful vehicle excitation, such as, for example, when driving on a poor road or with unfavorable natural frequency, a disruptive noise development can thus be prevented. Furthermore, the winding device is constructed in a mechanically very simple manner. In addition, the winding device affords the advantage that a simple assembly of the winding device is possible since, for example, the rod element can be inserted in the hollow space in a simple manner and no additional connections are required with respect to the winding element or a vehicle. Consequently, any costs for the winding device itself and for the assembly thereof can be achieved.

According to an embodiment, the rod element has (distributed over a longitudinal rod axis) a plurality of contact locations with the coil spring. This has the advantage that the rod element tensions the coil spring over the plurality of the contact locations. Preferably, the boundary points have different peripheral angles with respect to the longitudinal rod axis so that the radial tensioning is achieved in different spatial directions starting from the longitudinal rod axis.

In another embodiment, the contact locations of the rod element, in a state in which the rod element is not arranged in the hollow space of the coil spring, has with respect to the longitudinal rod axis a radial spacing which is greater than half a diameter of a geometric cross-section of the hollow space of the coil spring. The state can also be referred to as a non-assembled state. The hollow space of the coil spring substantially has a circular geometric cross-section. The rod element in contrast has with respect to the longitudinal rod axis the contact locations which have different radial spacings with respect to the longitudinal rod axis, wherein the radial spacings are greater than half a diameter or a radius of the geometric cross-section of the hollow space. It is thereby possible to radially tension the coil spring.

According to another embodiment, the rod element is constructed in a coil and/or spiral manner. That is to say, the rod element has a curved and/or wound path with respect to the longitudinal rod axis. In particular, a center line of a geometric cross-section of the rod element is curved or not straight. It is thereby possible for the rod element to have different contact locations or abutment locations with the coil spring and to radially tension it. That is to say, the rod element has, in the non-assembled state, in a plurality of portions an expansion in a radial direction with respect to a longitudinal rod axis which is greater than half a diameter of the geometric cross-section of the hollow space of the coil spring. In this instance, it is possible for a geometric cross-section of the rod element to be smaller than the geometric cross-section of the hollow space of the coil spring.

According to another embodiment, the rod element is constructed in an undulating manner.

According to another embodiment, the rod element has thickened portions and/or projections. The thickened portions or projections produce the contact with the coil spring and radially tension it.

Such embodiments of the rod element enable the above advantages.

According to another embodiment, the winding element is a pipe element having a hollow space and the coil spring is arranged in the hollow space of the winding element. This affords the advantage that the tubular winding element forms an outer protection, for example, against wear, for the coil spring.

According to another embodiment, the winding device further has a bearing element, which can be securely connected to the vehicle, wherein the winding element is rotatably supported on the bearing element and is connected to the bearing element by means of the coil spring. It is thereby possible for the winding element to be able to be rotatably supported on the vehicle in a mechanically secure manner by means of the bearing element. As a result of the fact that the winding element is additionally connected to the bearing element by means of the coil spring, the coil spring can be pretensioned during a rotational winding or unwinding movement of the winding element.

According to a second aspect of the invention, there is described a roller blind arrangement which has a winding device according to the first aspect. The roller blind arrangement further has a roller blind web which is connected to the winding element in a mechanically secure manner.

The roller blind arrangement according to the second aspect substantially enables the above-mentioned advantages.

According to a third aspect of the invention, there is described a roof arrangement for a vehicle which has a transparent roof panel and which has a roller blind arrangement according to the second aspect of the invention, wherein the roller blind arrangement is arranged in the region of the roof panel in order to at least partially cover the roof panel.

The roof arrangement according to the third aspect of the invention substantially enables the above-mentioned advantages.

Other advantageous embodiments of the invention are explained in the following description of an embodiment.

BRIEF DESCRIPTIONS OF THE DRAWINGS

The invention is described in detail below with reference to the embodiment using the appended Figures.

In the Figures:

FIG. 3 is a detailed view of the longitudinal section,

FIG. 4 is a cross-section through the detailed view according to FIG. 3,

Elements with the same construction or function are indicated with the same reference numerals in all the Figures.

DETAILED DESCRIPTION

Figure 1:
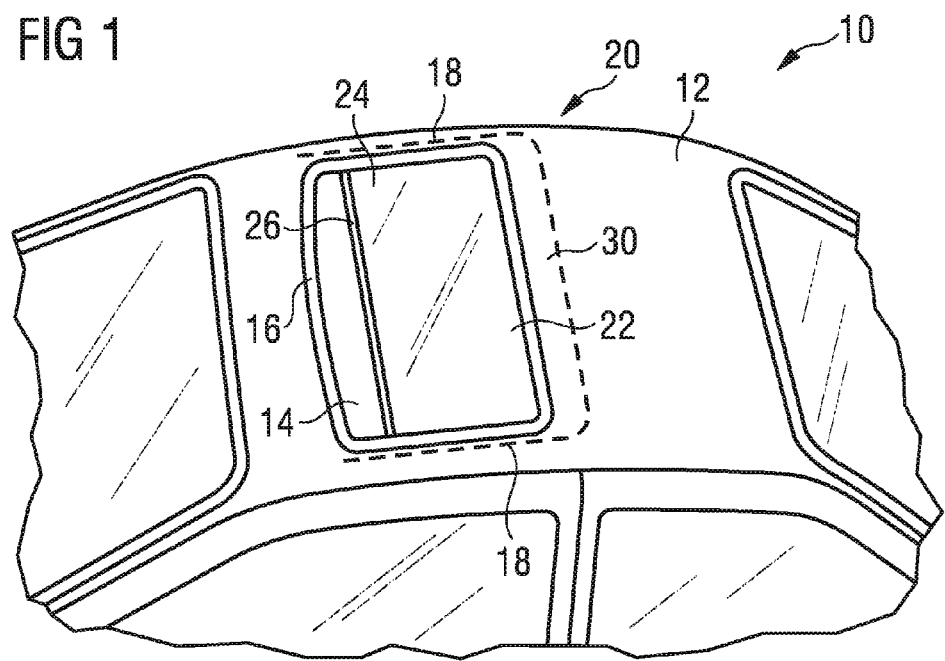
FIG. 1 is a perspective view of a roof arrangement of a vehicle.

FIG. 1 illustrates a vehicle 10 with a roof arrangement which has a vehicle roof 12 which is provided with a roof opening 14. The roof opening 14 is either closed or at least partially able to be released by means of a displaceable sliding roof cover, for example, a transparent roof panel. Alternatively, the roof opening 14 can also be closed by means of a fixedly arranged, that is to say, non-displaceable, transparent roof panel. The roof opening 14 is delimited by means of a roof opening frame 16 which is constructed on the vehicle roof 12. The roof opening frame 16 preferably has guide rails 18 which are arranged at both sides and in which a roller blind arrangement 20 is arranged below the displaceable sliding roof cover.

The roller blind arrangement 20 has a roller blind web 22 which, with respect to the vehicle 10, can be displaced forward in an unwinding direction and backward in a direction counter to the unwinding direction. If the roller blind web 22 is pushed completely backward, the roof opening 14 or the sliding roof cover or the roof panel is completely released. In a completely released state, sunlight and/or ambient air can be introduced into the inner space of the vehicle in an unimpeded manner via the roof opening 14. However, if the roller blind web 22 is pushed completely forward, the roof opening 14 is covered by the roller blind web so that direct sunlight and/or ambient air can only partially reach the inner space of the vehicle.

At an end of the roller blind web 22 which is the rear end of the roller blind web 22 with respect to the longitudinal direction of the vehicle, the roller blind web 22 may be completely wound up. At another end 24 of the roller blind web, which is the front end of the roller blind web with respect to the longitudinal direction of the vehicle, there is arranged a curved pulling member 26 which a vehicle occupant can manually or electrically activate in order to thus push or pull the roller blind web 22 forward or backward, respectively.

In a region of the rear end of the roof opening 14, there is arranged a winding device 30 which is described in detail below in FIGS. 2 to 6.

Figure 2:
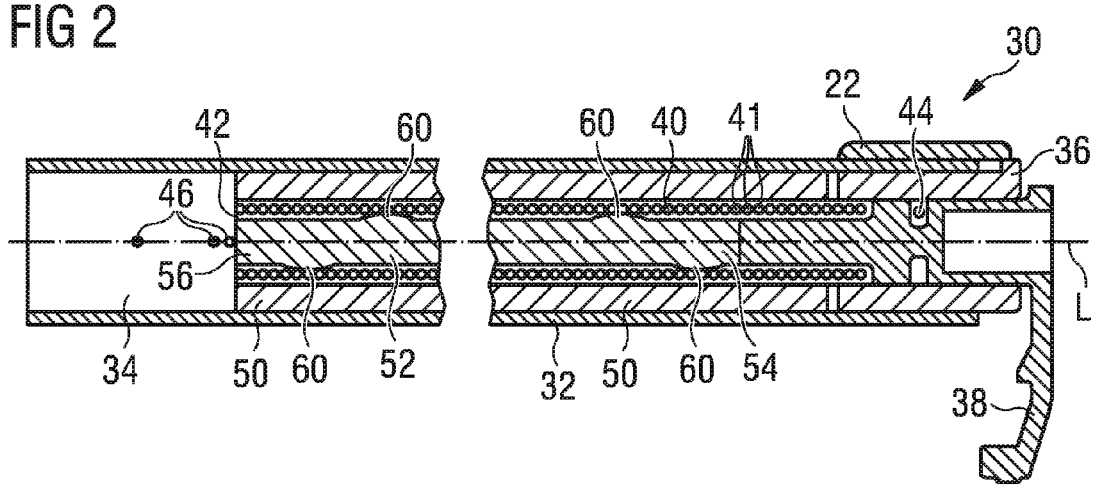
FIG. 2 is a longitudinal section of the winding device.

FIG. 2 shows a longitudinal section through the winding device 30. The winding device 30 has a winding element 32 with a longitudinal axis L. The winding element 32 is preferably constructed as a tubular element with a hollow space 34. Preferably, the roller blind web 22 can be wound up and unwound on the tubular winding element 32. In a wound state, the roller blind web 22 forms a roller blind winding.

The winding device 30 further has a bearing bush 36 which is arranged at an axial end of the tubular winding element 32 and which is securely connected to the winding element 32.

The winding device 30 further has at least one bearing element 38 which is, for example, securely connected to the roof opening frame 16 of the vehicle 10. The bearing element 38 may also be secured to another portion of the vehicle 10, for example, to a window frame or a door frame or to the edge of an opening of another component of the vehicle 10. The winding element 32 is rotatably supported on the bearing element 38 with respect to the longitudinal axis L by means of the bearing bush 36.

The winding device 30 has a coil spring 40. The coil spring 40 has a large number of windings 41. The coil spring 40 is arranged in the hollow space 34 of the tubular winding element 32. The coil spring 40 has a hollow space 42 and a first spring end portion 44 and a second spring end portion 46. The first spring end portion 44 and the second spring end portion 46 are arranged at two axially opposing ends of the coil spring 40. The first spring end portion 44 is securely connected to the bearing element 38. The second spring end portion 46 is preferably constructed in a rectangular manner (see FIG. 3). The second spring end portion 46 may also be constructed separately from the remaining portions of the coil spring 40. This would have the advantage that the sequence in the assembly of the winding device 30 could be changed, if necessary. In particular, the spring end portion 46, which is constructed as a rectangular frame, is arranged in the region of the longitudinal axis L of the winding element 32.

As illustrated with reference to FIG. 4, there are arranged in the winding element 32 recesses 48 which are preferably constructed in the manner of a groove. The recesses 48 of the winding element 32 are preferably separated from each other by means of webs 49. The second spring end portion 46 is arranged in the hollow space 34 of the winding element 32 in such a manner that two lateral portions of the rectangular second spring end portion 46 engage in two groove-like recesses 48 of the winding element 32. Consequently, the rectangular second spring end portion 46 is connected to the winding element 32 in such a manner that, when the winding element 32 is rotated about the longitudinal axis L, in particular by winding up or unwinding the roller blind web 22, the second spring end portion 46 of the coil spring 40 can be caused to rotate by the winding element 32. Consequently, in the event of a rotation movement of the winding element 32 about the longitudinal axis L, a tensioning or relaxing of the coil spring 40 can be enabled.

A damping element 50 is arranged radially between the coil spring 40 and the tubular winding element 32. The damping element 50 preferably completely or partially comprises a plastics material, in particular an elastomer material. By means of the damping element 50, direct contact between the coil spring and the winding element 32 in the region of the windings 41 can be prevented. Consequently, the damping element 50 may provide an effective contribution to noise damping of the winding device 30.

A rod element 52 is arranged in the hollow space 42 of the coil spring 40. The rod element is preferably arranged over a significant portion of the axial length of the coil spring 40 in the region of the windings 41 so that the rod element 52 can guide the coil spring 40 in a particularly effective manner. The rod element 52 has a first rod end portion 54 and a second rod end portion 56 which are arranged at two axial, opposing ends of the rod element 52. The first rod end portion 54 abuts the bearing element 38. The second rod end portion 58 abuts the frame-like second spring end portion 46 of the coil spring 40, as illustrated with reference to FIGS. 2 and 3. As a result of the abutment of the rod element 52 in the region of the rod end portions 54, 56 with the bearing element 38 and the second spring end portion 56, it becomes possible for the movement of the rod element 52 to be limited in the direction of the longitudinal axis L. It can thereby be ensured that the rod element 52 substantially always remains in an identical axial position with respect to the coil spring 50. It can consequently be ensured that the rod element 52 can guide the coil spring 40.

Figure 5:
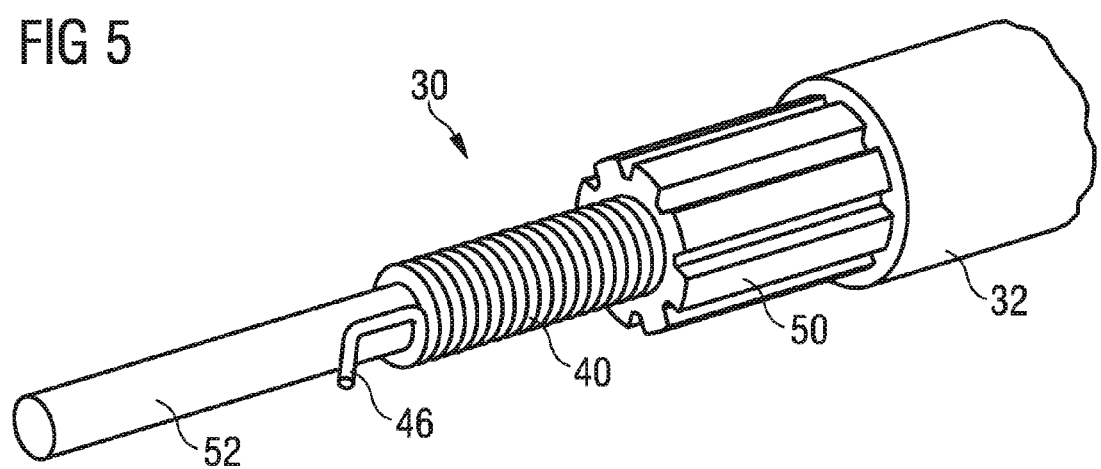
FIG. 5 is a perspective view of a winding device for the roof arrangement.

FIG. 5 is a partial exploded view of the winding device 30. In this instance, it can clearly be seen that the winding element 32 surrounds the damping element 50. The coil spring 40 and the rod element 52 are arranged within the damping element 50. In this instance, the second spring end portion 46 is also shown.

The rod element 52 preferably comprises polyoxymethylene or has polyoxymethylene. Polyoxymethylene is a mechanically very stable material and has a high breaking resistance.

As illustrated with reference to FIG. 6, the rod element 52 is constructed in a helical manner. This means that the rod element 52 has, at outer sides with respect to a longitudinal rod axis 58 which connects central locations of geometric cross-sections of the first rod end portion 54 and the second rod end portion 56, different spacings with respect to the longitudinal rod axis 58. That is to say, the rod element 52 has a central line 59 of a cross-section extent with respect to the longitudinal rod axis 58 which is curved and which does not coincide with the longitudinal rod axis 58. The geometric cross-section of the rod element 58 is substantially identical with respect to a length of the rod element 52 and circular. As a result of the helical shape, the rod element 52 expands against the coil spring 40 and tensions the winding device 30 per se. As a result of the helical configuration of the rod element 52, a three-dimensional abutment of the rod element 52 within the coil spring 40 is achieved so that the coil spring 40 is radially tensioned. Consequently, a rattling of the winding device 30, in particular at high speeds of up to 250 km/h, is prevented. It is consequently practically impossible for disruptive noise to be produced.

Figure 6:
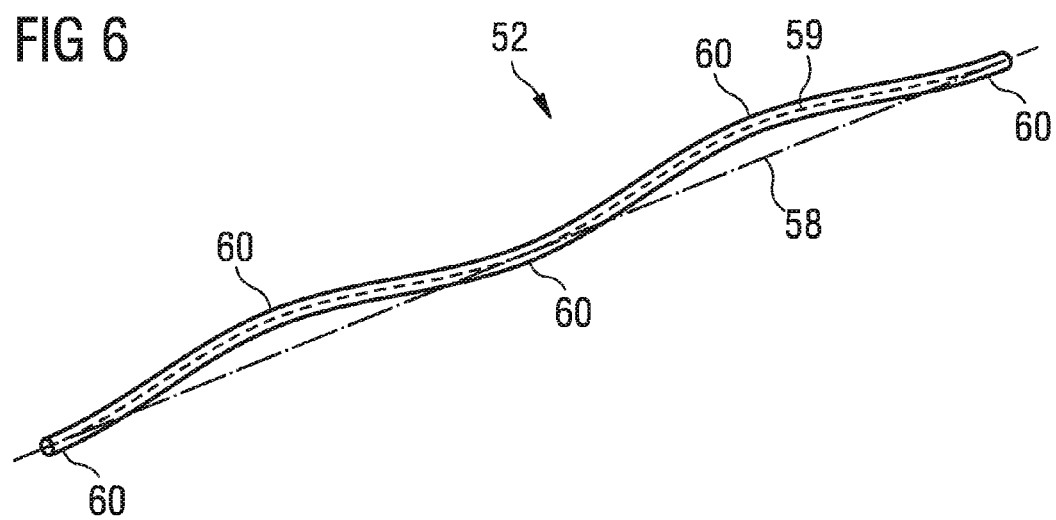
FIG. 6 is a perspective view of a rod element of the winding device.

As a result of the helical configuration of the rod element 52, the rod element 52 has a plurality of contact locations 60 with the coil spring 40, as shown with reference to FIGS. 2 and 6. In a non-assembled state of the rod element 52, that is to say, when the rod element 52 is not inserted or introduced into the hollow space 42 of the coil spring 40, the contact locations 60 have with respect to the longitudinal rod axis 58 a larger radial spacing than half a diameter or a radius of the hollow space 42 of the coil spring. With respect to the longitudinal axis L of the winding element 32, the contact locations 60 consequently have a larger radial spacing with respect to the longitudinal axis L than half a diameter of the hollow space 42 of the coil spring 40. The contact locations 60 have, with respect to the longitudinal rod axis 58 or the longitudinal axis L of the winding element 32, different peripheral angles so that the expansion or the tensioning is carried out in different spatial directions.

When the rod element 52 is introduced into the hollow space 42 of the coil spring 40, the application of a force is consequently required for assembly. This is a result of the fact that the rod element 52 radially tensions the coil spring 40 and during the assembly a friction force thus has to be overcome. In the assembled state, the rod element 52 expands the coil spring 40 radially outward and consequently tensions it.

Alternatively, the rod element 52 may also be constructed in an undulating or helix-like manner. Alternatively or additionally, the rod element 52 may also have projections or formations which also ensure the radial tensioning of the coil spring 40.

Depending on a tension state of the coil spring 40, both the length of the coil spring 40 in the direction of the longitudinal axis L and the diameter thereof change. Consequently, with a completely deployed roller blind web 22, that is to say, which is unwound from the winding device 30, the length of the coil spring 40 is at a maximum and the diameter of the coil spring 40 is at a minimum. With a roller blind web 22 which is completely wound up, however, the length of the coil spring 40 is at a minimum and the diameter of the coil spring 40 is at a maximum. The rod element 52 is preferably sized in such a manner that the coil spring 40, even at the maximum length of the coil spring 40, can be safely guided and stabilized by the rod element 52. The rod element 52 is further preferably sized in such a manner that the radial spacing of the contact locations 60 in the non-assembled state described above is always greater than half the diameter of the hollow space 42 of the coil spring 40 in the non-assembled state. Consequently, in the event of a change of the diameter of the coil spring 40, the rod element 52 is intended to be prevented from being loosely received in the coil spring 40, which would lead to rattling and negative noise developments.

The winding device 30 described with reference to the embodiment can, in addition to the roof arrangement for a vehicle, also be provided in other arrangements. Such other arrangements are, for example, roller blind arrangements for glass roofs in buildings, in particular in conservatories or on house roofs. The roller blind webs further do not necessarily have to act as sun protection, but can also, for example, be used as mosquito protection grids.

The invention is not limited to the embodiment set out. In particular, it is possible to combine the features differently with each other so that such arrangements of the invention are also included. It is particularly decisive for the rod element 58 to be used in the described embodiments so that the radial tensioning of the coil spring 40 is achieved. The structural configuration of the winding device 30, which is described with reference to FIGS. 2 to 6, can be seen only by way of example and may have other structural configurations and arrangements.

The invention claimed is:

1. A winding device for a roller blind arrangement for a vehicle, comprising:
    a winding element having a longitudinal axis, which is designed to be rotatably supported about the longitudinal axis on a vehicle and to wind and unwind a roller blind web;
    a coil spring having an axially extending hollow space, wherein the winding element is connected to the vehicle by means of the coil spring and the coil spring enables a rotational movement of the winding element relative to the vehicle; and
    a rod element which is arranged in the hollow space of the coil spring for guiding the coil spring, wherein the rod element is made from a rigid material and constructed in such a manner that the rod element directly contacts the coil spring by expanding against the coil spring in the hollow space and radially tensions the coil spring,
    wherein the rod element has a plurality of contact locations with the coil spring, the contact locations being distributed over a longitudinal rod axis.

2. The winding device according to claim 1, wherein the contact locations of the rod element, in a state in which the rod element is not arranged in the hollow space of the coil spring, has with respect to the longitudinal rod axis a radial spacing which is greater than half a diameter of a geometric cross-section of the hollow space of the coil spring.

3. A winding device for a roller blind arrangement for a vehicle, comprising:
    a winding element having a longitudinal axis, which is designed to be rotatably supported about the longitudinal axis on a vehicle and to wind and unwind a roller blind web;
    a coil spring having an axially extending hollow space, wherein the winding element is connected to the vehicle by means of the coil spring and the coil spring enables a rotational movement of the winding element relative to the vehicle; and
    a rod element which is arranged in the hollow space of the coil spring for guiding the coil spring, wherein the rod element is constructed in such a manner that the rod element radially tensions the coil spring;
    wherein the rod element has a curved and/or wound path with respect to the longitudinal rod axis.

4. A winding device for a roller blind arrangement for a vehicle, comprising:
    a winding element having a longitudinal axis, which is designed to be rotatably supported about the longitudinal axis on a vehicle and to wind and unwind a roller blind web;
    a coil spring having an axially extending hollow space, wherein the winding element is connected to the vehicle by means of the coil spring and the coil spring enables a rotational movement of the winding element relative to the vehicle; and
    a rod element which is arranged in the hollow space of the coil spring for guiding the coil spring, wherein the rod element is constructed in such a manner that the rod element radially tensions the coil spring;
    wherein the rod element is formed in an undulating manner.

5. The winding device according to claim 1, wherein the rod element has thickened portions and/or projections.

6. The winding device according to claim 1, wherein the winding element is a pipe element having a hollow space and the coil spring is arranged in the hollow space of the winding element.

7. The winding device according to claim 1, further having a bearing element, which can be securely connected to the vehicle, wherein the winding element is rotatably supported on the bearing element and is connected to the bearing element by means of the coil spring.

8. A roller blind arrangement comprising:
    a winding device according to claim 1, and
    a roller blind web which is connected to the winding element in a mechanically secure manner.

9. A roof arrangement for a vehicle comprising:
    a transparent roof panel, and
    a roller blind arrangement according to claim 8, wherein the roller blind arrangement is arranged in the region of the roof panel in order to at least partially cover the roof panel.

* * * * *